United States Patent [19]

Neal et al.

[11] 4,050,651
[45] Sept. 27, 1977

[54] WING AND REDUCED AIRSPEED SYSTEM FOR JET AIRCRAFT

[75] Inventors: Ronald D. Neal, Wichita; Richard Ross, Sedgwick; Joseph N. Hein, Wichita, all of Kans.

[73] Assignee: The Gates Rubber Company, Denver, Colo.

[21] Appl. No.: 699,391

[22] Filed: June 24, 1976

[51] Int. Cl.² .......................... B64C 13/16; B64C 3/10
[52] U.S. Cl. ................................ 244/15; 244/35 R; 244/200; 244/82; 244/76 C; 244/181
[58] Field of Search ................. 244/35 R, 34 R, 35 A, 244/40, 41, 766, 181, 188, 82, 13, 123, 15

[56] References Cited
U.S. PATENT DOCUMENTS

| 1,948,629 | 2/1934 | Pitts | 244/35 R |
|---|---|---|---|
| 2,441,758 | 5/1948 | Garbell | 244/35 R |
| 2,985,410 | 5/1961 | Richter et al. | 244/82 X |
| 3,072,369 | 1/1963 | Aderson | 244/188 X |

OTHER PUBLICATIONS

Welsh et al., "Effects of Some Leading-Edge Modifications ...", Jan. 18, 1955 NACA RM L54K01.
Graham et al., "Investigation of the Effects of an Airfoil Sec. Modification ...", June 28, 1955 NACA RM A55 11.
Holdaway et al., "Investigation of Sym. Body Indentations ...", Mar. 19, 1957 NACA RM A56K26.
Nelson et al., "The Effects of Wing Profile on the Transonic Characteristics of ...", Oct. 27, 1954 NACA RM A54H12a.
Sandahl et al., "Effects of Some Section Modifications and Protuberances on the Zero-Lift . . . ", 2/18/54 NACA RM L53L24a.
Jane's All The World's Aircraft, edited by John Taylor, "Gates Learjet", 1974-1975, (received 4-25-75), pp. 338-341.
Evans, William T., "Leading-Edge Contours for Thin Swept Wings: An Analysis of Low- and High-Speed Data.", NACA RM A57B11, 3/29/57.
Miller, Mack, "The Gates Learjet Model 25" (a Pilot Report by Mack Miller), Flying, Feb. 1969.
James, Harry A., "Effects of Double-Slotted Flaps and Leading-Edge Modifications on the Low-Speed ...", NACA RM A51D18, 7/23/51.
Maki, Ralph et al., "An Investigation at Subsonic Speeds of Several Modifications to the Leading-Edge . . . ", NACA TN 3871, Dec. 1956.
"Introducing the Howard/Raisbeck Mark II System", © 1975.

Primary Examiner—Trygve M. Blix
Assistant Examiner—Galen Barefoot
Attorney, Agent, or Firm—H. W. Oberg, Jr.; Raymond Fink; Curtis H. Castleman, Jr.

[57] ABSTRACT

A thin, high performance swept wing of the tapered type with an improved leading edge characterized by (1) camber that increases from a minimum near the wing root to a maximum near the wing tip, and (2) substantially a constant leading edge radius extending substantially across the wing span which defines a "blunt" contour. The wing in combination with a T-tail aircraft with a stick shaker/pusher activated by a rate of change of angle of attack sensor and optionally a strake between the leading edge and a wing tip tank which intrinsically combine to define a system that enhances aircraft performance by reducing minimum airspeed without impairing aircraft performance at high subsonic Mach (M) numbers.

13 Claims, 6 Drawing Figures

WING AND REDUCED AIRSPEED SYSTEM FOR JET AIRCRAFT

BACKGROUND OF THE INVENTION

The invention relates to aeronautics, but more particularly, the invention relates to lift modifications of sustaining airfoils (wings) that intrinsically combine to safely reduce takeoff and landing air speeds of a T-tail aircraft having a stick shaker/pusher activated by an angle of attack rate of change sensor.

An aircraft wing is shaped to provide a required lift with a least possible drag. However, the shape of the wing is compromised between that aerodynamic shape that is most efficient for aircraft cruising speed and that aerodynamic shape required for low air speeds such as encountered during takeoff and landing. Typically, high speed ($M \geq .6$) wings are thin and require extensive movable surfaces that effect wing reshaping for low airspeeds ($M \leq .15$).

As noted in the publication, Hickey et al, Large-Scale Wind-Tunnel Tests of an airplane model with a 45° sweptback wing of aspect ratio 2.8 Employing High-Velocity Blowing over the Leading-and Trailing-Edge Flaps (NACA RM A58A09):

"The use of thin, low-aspect ratio, sweptback wings on modern aircraft seriously limits the low-speed maximum lift and longitudinal stability."

To compromise the difference between high and low speed lift and drag, many wings are provided with various movable control surfaces such as trailing edge flaps or leading edge devices that are normally held in a passive position at cruising speed but are extended for low airspeeds.

In the past, movable leading edge devices have been preferred over fixed wing leading edges because they effect efficient leading edge reshaping for high and slow speed flight performance. When a high speed wing is operated at slow speeds, it is subject to leading edge stall because the airflow over the wing must turn abruptly in order to flow up and around the leading edge. As it turns, the airflow may separate from the upper wing surface, thereby initiating wing stall. To delay airflow separation, leading edge devices are typically used which extend forward and downward from the wing. The movable leading edge devices allow the wing to achieve higher angles of attack before it stalls. The leading edge devices effectively reduce the minimum airspeed of a high speed wing. In other words, the movable leading edge devices reduce the stall speed of the wing without hindering the thin profile required for high speed performance, e.g., Mach $\geq .6$.

While movable leading edge devices enhance the performance of a high speed wing, they require auxiliary structure, power and controls for moving them from a passive to active position; this adds weight and cost and further equipment complication which can reduce reliability.

A widely used contour modification for increasing the maximum lift coefficient of thin sweptback wings is to droop the wing leading edge with or without an increased leading edge radius. Anderson et al., A Flight Investigation of the Effect of Leading-Edge Camber on the Aerodynamic Characteristics of a Swept-Wing Airplane, NACA RM A52L16a, 1953; Demele et al, The Effects of Increasing the Leading-Edge Radius and Adding Forward Camber on the Aerodynamic Characteristics of a Wing with 35° Sweepback, NACA RM A50K28a, 1951; Dew, Effects of Double-Slotted Flaps and Leading Edge Modifications on the Low-Speed Characteristics of a Large-Scale 45° Sweptback Wing with the without Camber and Twist, NACA RM A51 D18, 1951; Evans, Leading-Edge Contours for thin Swept-Wings: An analysis of Low-and High-Speed Data, NACA RM A57B11, 1957 (declassified 1959); Goradia et al, Laminar Stall Prediction and Estimation of $C_{L(max)}$, Journal of Aircraft, vol. 11, no. 9, Sept. 1974, pp. 528–536; Hicks et al, Effects of Forward Contour Modification on the Aerodynamic Characteristics of the NACA 64, −212 Airfoil Section, NASA TM X-3293, September 1975; Kelly, Effects of Modifications to the Lead-Edge Region on the Stalling Characteristics of the NACA 63, −012 Airfoil Section, NACA TN 2228, 1950; Maki, Full-Scale Wind-Tunnel Investigations of the Effects of Wing Modifications and Horizontal-Tail Location on the Low-Speed Static Longitudinal Characteristics of a 35° Swept-Wing Airplane, NACA RM A52B05, 1952; Maki, An Investigation of Subsonic Speed of Several Modifications to the Leading-Edge Region of the NACA 64 A010 Airfoil Section, NACA TN 3871, 1956.

While it is generally known that thin wing performance can be improved somewhat at low speed by increasing the leading edge radius and drooping the leading edge such as illustrated at page 27 of the Maki (1952) reference supra, the prior art leading edge radius changes do not effect improved performance over all airspeeds. Moreover, prior art leading edge radius changes are restrictive as to the location of radius change for given wing types. For example, the Evans reference supra, concludes at page 8 that improved wing performance at low speeds can be achieved by increasing the leading edge radius at the outboard portions of the wing and that a full span radius contour is likely to result in wave drag penalty which inhibits performance. The findings of the references are quite restrictive in that there are other secondary factors which may affect performance such as; wing sweep; wing taper; wing aspect ratio; or other surfaces attached to the wing which influence aerodynamic performance such as wing tip tanks. However, there is one thing in common in the references and that is that the leading edge radius is defined as a fraction of chord length. This is the standard practice as originally developed with the NACA airfoil section definitions. The NACA practice is to define thickness ordinates as a fraction of the airfoil chord. The basic chord is defined in unitless form so that families or airfoils may be easily extrapolated therefrom. Commonly, a wing definition is linearly interpolated between the wing root and the wing tip at some predetermined ratio making the chords at the root and tips proportional. Accordingly, the radius at the leading edge of the wing changes dimension from a larger value at the root to a smaller value at the tip.

A wing to which this invention is particularly directed is derived from the NACA 64A 109 airfoil section: 6 designates the NACA series; 4 designates a chord-wise position of minimum pressure expressed in tenths of the chord; "A" designates an airfoil that is substantially straight from about eight tenths of the chord to the trailing edge; 1 designates a design lift coefficient in tenths; and the 09 expresses the thickness of the wing as a percent of chord. A wing with this particular airfoil type was tested with an associated aircraft to evaluate their aerodynamic characteristics. The results of this test are given in the publication:

Soderman, Full-Scale Wind-Tunnel Test of a small unpowered jet aircraft with a T-tail, NASA TN D 6573, 1971. Several leading edge configurations forward of the 6 percent chord line of the standard wing were tested and analyzed. Of these, one was a blunt leading edge with a leading edge radius that varied linearly from root to tip and another was a 30° drooped leading edge that simulated a hinged-type leading edge. The blunt and drooped configurations were tested for their effectiveness at slow airspeeds. While the blunt leading edge configuration marginally reduced wing stall speed, the 30° drooped leading edge significantly reduced wing stall speed. A hinged system would be required for the 30° droop to maintain high speed performance whereas the blunt configuration would only marginally decrease high speed performance.

To further evaluate leading edge modifications to the NACA 64A 109 airfoil, a Model 36 Gates Learjet aircraft was configured with a "blunt-droop" leading edge forward of the 6 percent chord line over approximately the outboard 40 percent of the free wing semi-span as suggested by Evans, page 8 (1957) supra, for the purpose of improving stall speed characteristics of the T-tail aircraft. The leading edge had a 1.3 inch radius throughout the 40 percent outboard portion. It was concluded that this leading edge modification only marginally improved stall speed (i.e., reduced stall speed approximately 3 knots and that stall characteristics were essentially unchanged. Accordingly, this leading edge configuration did not yield the predicted performance increase as suggested by the above references.

Other passive devices may be used to enhance wing performance at low speeds. For example, for a high speed wing with tip tanks, airflow around the tip may be undesirably misdirected. The airflow misdirection can cause the tip portion of the wing to stall permaturely. Airflow over the tip portion of the wing can be substantially redirected with strakes that extend forward of the leading edge to intersect the tip tank. An example of such a strake appears at page 63 of the publication Aviation Week and Space Technology, Nov. 4, 1968. A detailed discussion of the influence of the strake appears in the February 1969 issue of the magazine "Flying" in a pilot report by Mack Miller. A photograph of a flying Learjet aircraft with strakes appears on the cover of the August 1969 issue of "Contrails."

Aircraft may exhibit unfavorable stall characteristics, such as unpredictable roll in either direction. Comparatively, a desirable stall is one in which there is a smooth pitch down of the aircraft without roll.

To improve safety, aircraft with undersirable characteristics are typically equipped with a stick shaker/pusher system that is activated by an angle of attack sensor. When a selected angle of attack is reached, the shaker/pusher system is activated which first shakes the aircraft's control column and then at a lower air speed pushes it forward to effect aircraft nose down pitch. The sensor and shaker/pusher combine to provide an artificial stall with desirable characteristics. The shaker/pusher system is set to actuate at an airspeed sufficiently above true stall to provide the desired characteristics for all types of stall entry. The shaker/pusher system (e.g., maximum limit of angle of attack) must be set to activate at higher airspeeds for high entry rates (e.g., 3 - 5 knots/second deceleration) even through the setting could be at a lower air-speed for entry rates of 1 knot/second as established by the FAA for the definition of stall speed. As a result, the artificial stall initiated by the shaker/pusher system will be above the true stall speed (e.g., 3 - 5 knots above) for normal entry rates.

Some aircraft wing retrofiters have employed stall turbulators or strips at the wing leading edge to initiate stall over the inboard section of the wing while permitting the outboard section of the wing to remain flying. While such a configuration may effect a premature stall with improved stall characteristics in some situations, it does not eliminate the requirement for a stick shaker/pusher system. The stall turbulators at the wing leading edge to not come without penalty. They may increase the minimum stall speed while also increasing drag at high speed. An example of a wing stall turbulator is disclosed in the publications: SAE Paper 760471 and "Mark II System", Dee Howard Company (1975).

A stall turbulator and angle of attack sensor may collectively combine to give a pilot a feeling of satisfactory stall characteristics and raise the minimum airspeed of such T-tail aircraft. This is because the stall turbulators may increase the minimum stall speed and the angle of attack sensor must be set to accommodate all reasonably predictable rates of change of pitch attitude. The effects of the stall turbulator and differential velocity are mathematically combined to raise minimum airspeed of such T-tail aircraft. The leading edge of this invention in combination with a T-tail aircraft, a stick shaker/pusher and an angle of attack rate of change sensor overcome these difficulties.

SUMMARY OF THE INVENTION

In accordance with the invention an improved leading edge for a thin, high performance wing is provided and characterized by a substantially constant leading edge radius that extends substantially across the entire wing span to define a blunt contour. Preferably, the leading edge extends forward of about the 15 percent chord line of a standard NACA 64 A-109 airfoil. More preferably, the wing has a quarter chord sweep of 13°, an aspect ratio of 5.02, a taper ratio of .507, and a dihedral angle of 2.5°. Most preferably, the so modified wing is an installed on Gates Learjet type aircraft with fuel tanks mounted at the wing tips. Thus, one aspect of this invention is primarily directed to a thin, high speed wing having a fixed leading edge contour which improves slow speed performance without imparing high speed operation.

The leading edge, wing, and associated aircraft are combined with a stick shaker/pusher system that is activated by an angle of attack rate of change sensor to intrinsically enhance aircraft performance at both high and low airspeeds. Strakes between the wing leading edge and fuel tanks may also be included in the combination to improve stall characteristics.

Accordingly, an object of the invention is to provide a fixed leading edge contour which enhances performance of a wing having an NACA section 64A-109 airfoil section.

Another object of the invention is to combine the modified leading edge wing with an aircraft of the T-tail type requiring a stick shaker/pusher to effect improved aircraft performance at low air speeds.

Still another object of the invention is to combine and angle of attack rate of change sensor with the stick shaker/pusher and leading edge configuration to effect a system for T-tail aircraft which greatly enhances performance by reducing stall speed.

Yet another object of the invention is to provide a fixed leading edge contour which enhances both minimum and cruising air speed performance.

An advantage of the invention is that aircraft using the system exhibit a lower minimum airspeed combined with improved flight safety.

These and other objects or advantages of the invention will be apparent after reviewing the drawings and description thereof wherein.

DESCRIPTION OF PREFERRED EMBODIMENTS

Referring to the figures, an improved high performance wing 10 is provided and shown installed on a T-tail aircraft 11. Preferably, the aircraft is a Gates Learjet type as manufactured by the Gates Learjet Corporation.

Figure 4:
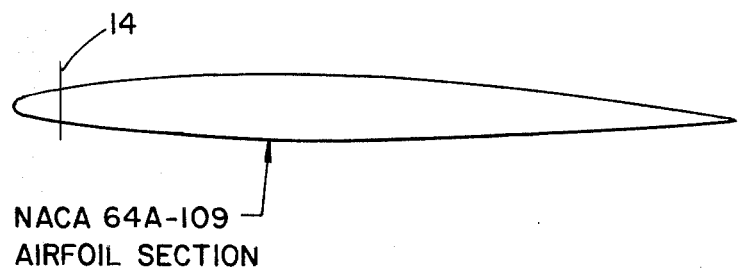
FIG. 4 is a view showing the contour of a standard NACA 64A 109 airfoil section.

The wing 10 is of the thin, high speed type and is more preferably defined as having a 13° sweep at the quarter chord line; an aspect ratio of 5.02 (including the span through tip tanks); a taper ratio of 0.507; and a dihedral angle of 2.5°. More preferably, the wing has generally an NACA 64A-109 airfoil section that is modified generally at the lower surface 12 forward of about 15 percent of the chord line 13, 14 with the leading edge 17 of this invention. The standard NACA 64A-109 airfoil is as defined by the following table and as is substantially shown in FIG. 4.

NACA 64A-109
(Stations and ordinates given in percent of airfoil chord, C)

| Upper Surface | | Lower Surface | |
|---|---|---|---|
| Station | Ordinate | Station | Ordinate |
| 0.0 | 0.0 | 0.0 | 0.0 |
| 0.47 | 0.75 | 0.53 | — .70 |
| 0.71 | 0.91 | 0.79 | — .83 |
| 1.21 | 1.16 | 1.29 | — 1.04 |
| 2.45 | 1.63 | 2.55 | — 1.41 |
| 4.94 | 2.27 | 5.06 | — 1.91 |
| 7.44 | 2.77 | 7.56 | — 2.28 |
| 9.94 | 3.18 | 10.06 | — 2.58 |
| 14.94 | 3.82 | 15.05 | — 3.04 |
| 19.95 | 4.30 | 20.05 | — 3.38 |
| 24.95 | 4.67 | 25.05 | — 3.62 |
| 29.96 | 4.93 | 30.04 | — 3.78 |
| 34.97 | 5.08 | 35.03 | — 3.86 |
| 39.98 | 5.14 | 40.02 | — 3.86 |
| 44.99 | 5.05 | 45.01 | — 3.75 |
| 50.00 | 4.89 | 50.00 | — 3.56 |
| 55.00 | 4.62 | 55.00 | — 3.29 |
| 60.01 | 4.28 | 59.99 | — 2.98 |
| 65.02 | 3.87 | 64.98 | — 2.62 |
| 70.02 | 3.42 | 69.97 | — 2.23 |
| 75.03 | 2.91 | 74.97 | — 1.83 |
| 80.03 | 2.37 | 79.97 | — 1.43 |
| 85.03 | 1.77 | 84.97 | — 1.07 |
| 90.02 | 1.18 | 89.98 | — .72 |
| 95.01 | 0.59 | 94.99 | — .36 |

-continued
NACA 64A-109
(Stations and ordinates given in percent of airfoil chord, C)

| Upper Surface | | Lower Surface | |
|---|---|---|---|
| Station | Ordinate | Station | Ordinate |
| 100.0 | 0.0 | 100.0 | 0.0 |

L.E. radius: .0579C
Slope of radius through L.E.: .042

Figure 1:
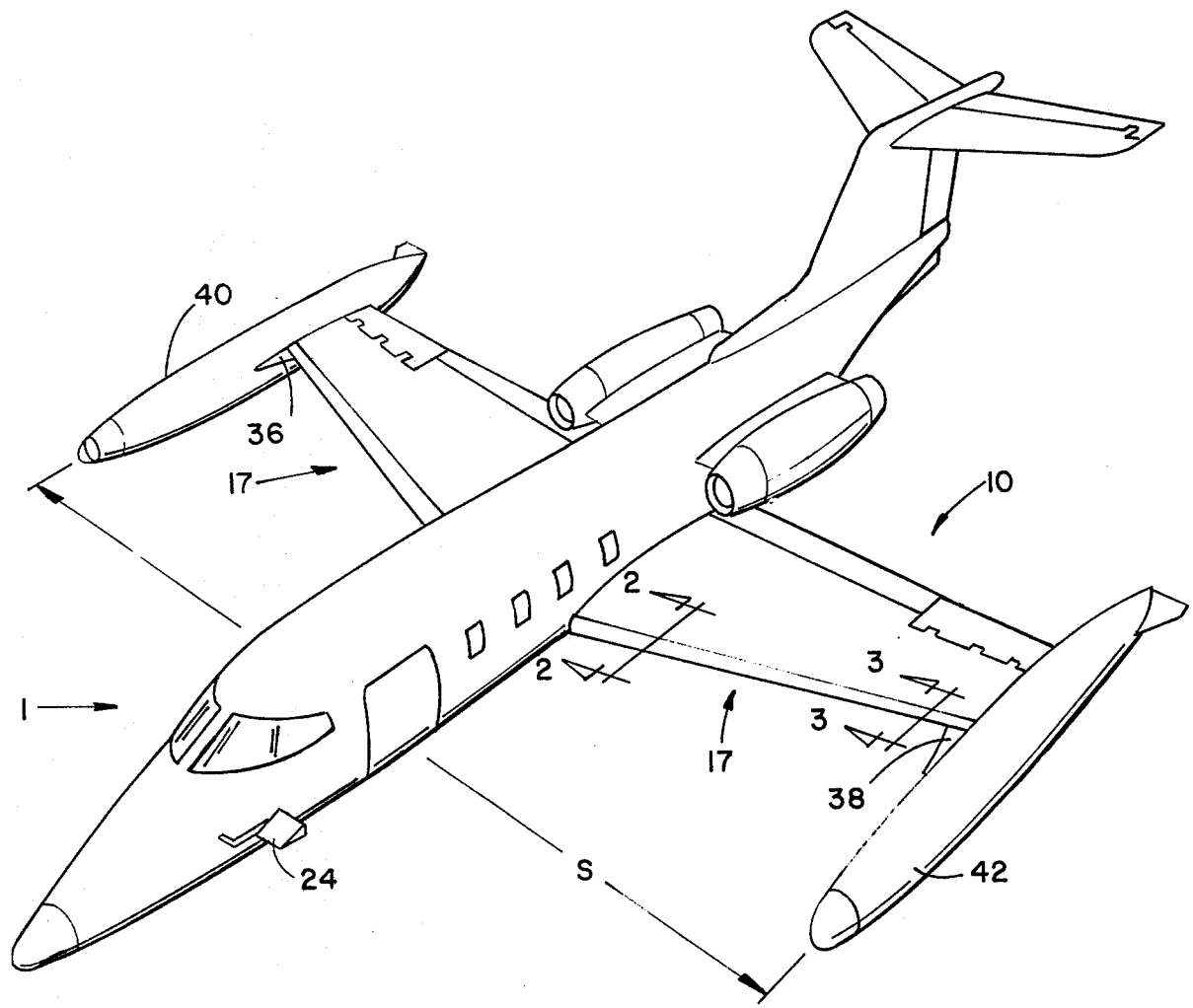
FIG. 1 is an isometric view of an aircraft (i.e., Gates Learjet type) including a wing leading edge contour of the invention.
Figure 2:
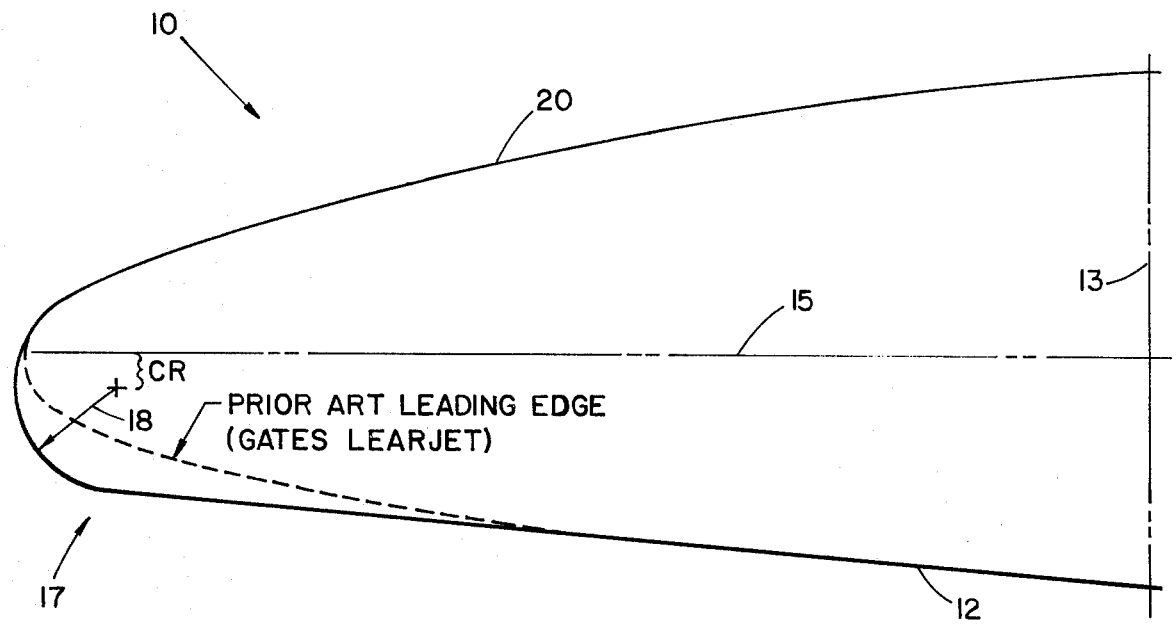
FIG. 2 is a view taken generally along the line 2—2 of FIG. 1 (partial section of wing leading edge at root)
Figure 3:
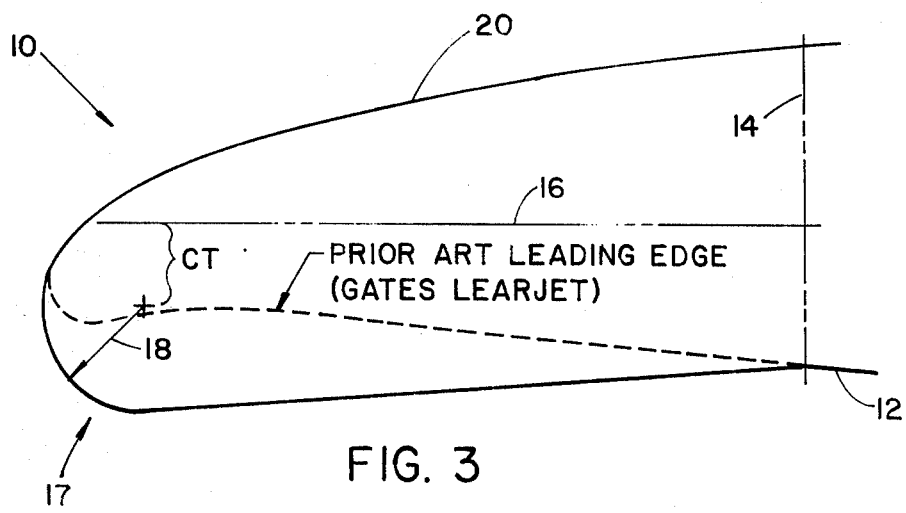
FIG. 3 is a view taken along the line 3—3 of FIG. 1; (partial section of wing leading edge at tip)

As previously noted, NACA airfoils are expressed in dimensionless numbers where thickness is expressed as a fraction of chord length. Thus, the leading edge radius of the table is expressed as a ratio of chord length. The basic wing is linearly tapered from the wing root chord to the wing tip chord. For example, the standard NACA airfoil section for FIG. 1 would have a chord dimension of 108.27 inches (275 cm.) at the wing root, and a chord dimension of 61.02 inches (155 cm.) at the wing tip adjacent the tip tanks.

In accordance with the invention, the leading edge 17 generally forward of the 15 percent chord line has a leading edge radius 18 that is substantially constant substantially throughout the wing span, S. In other words, the radius 18 does not vary linearly throughout the span as does the wing chord. For the wing of the above example, a leading edge radius of aboout 1.35 inches is most preferred for the root chord of 108.27 inches and a tip chord of 61.20 inches. However, radii of about 1.25 to about 1.45 inches are acceptable. The effect of the constant radius is to increase camber CR, CT from the root to tip and define a generally blunt leading edge that is effectively drooped increasingly from root to tip.

If the leading edge radius were expressed as a function of chord length, the preferrred leading edge radius of 1.35 inches would be 0.0125 of the chord at the wing root and 0.0221 of the chord near the wing tip.

Using the NACA system, the leading edge forward of about the 15 percent chord may be expressed by the following table. The upper surface 20 is tangential to the leading edge radius 18 whereas the leading edge radius 18 generally tangentially faired to the lower surface 12 with a substantially straight line from the point of tangency to about 15 percent chord line.

Airfoil Leading Edge Ordinates
Stations and Ordinates given in percent of Local Airfoil Chord Root Airfoil (Theoretical Chord = 108.27 in.)

| Upper Surface | | Lower Surface | |
|---|---|---|---|
| Station | Ordinate | Station | Ordinate |
| — .037 | — .265 | — .037 | — .265 |
| .324 | .607 | 1.247 | |
| .650 | .857 | radius | |
| 1.950 | 1.452 | 1.213 | — 1.512 |
| 3.251 | 1.865 | Straight | |
| 4.551 | 2.182 | Line | |
| 5.851 | 2.467 | From | |
| 7.44 | 2.77 | Tangent | |
| 9.94 | 3.18 | Point | |
| 14.94 | 3.82 | 15.00 | 3.029 |

Tip Airfoil (Theoretical Chord = 61.02 in.)

| Upper Surface | | Lower Surface | |
|---|---|---|---|
| Station | Ordinate | Station | Ordinate |
| −2.105 | −1.717 | −2.105 | −1.717 |
| −1.580 | −.350 | 2.212 | |
| −1.154 | .104 | radius | |
| .546 | .942 | .107 | 3.929 |
| 2.247 | 1.547 | Straight | |
| 3.948 | 2.019 | Line | |
| 5.649 | 2.418 | From | |

-continued

Airfoil Leading Edge Ordinates
Stations and Ordinates given in percent of Local Airfoil Chord

| 7.44 | 2.77 | | Tangent |
|------|------|------|------|
| 9.94 | 3.18 | | Point |
| 14.94 | 3.82 | 15.00 | 3.029 |

The following formula may also be used to characterize the leading edge radius:

$$R_{L.E.} = \frac{K\, C_T}{T_r}$$

where:
$R_{L.E.}$ = Leading edge radius as a fraction of root chord length
$C_T$ = Tip chord length as a fraction of root chord length
$T_r$ = Wing taper ratio in range of about .4 to .6
$K$ = Constant in range of about .0070 to .0129 (most preferably .01247)

Figure 5:
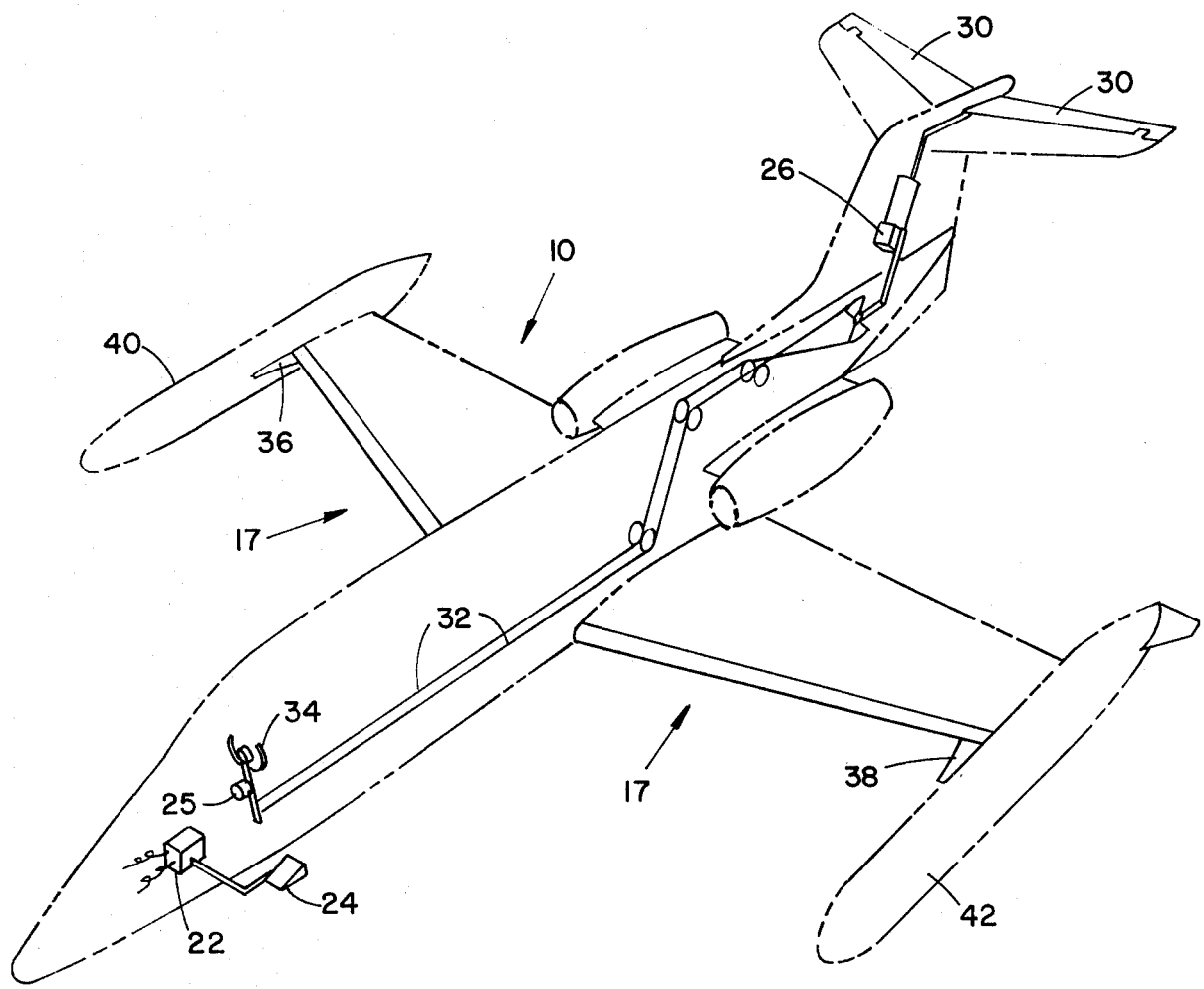
FIG. 5 is a schematical representation of an aircraft with the leading edge of the invention and showing an angle of attack rate of change sensor activating a stick shaker/pusher mechanism.

Referring more particularly to FIG. 5, the above described leading edge 17 is illustrated in combination with a Gates Learjet type aircraft utilizing an NACA 64A-109 airfoil section aft of the leading edge 17; an angle of attack rate of change sensor 22 responsive to movements of a vane 24; and a stick shaker/pusher system which for example many include a shaker 25 and pitch servo 26 that activates elevator control surfaces 30 in response to movements of an interconnected 32 stick 34 or to an electricl signal received from the angle of attack rate of change sensor.

The rate of change of angle of attack sensor 22 is of a conventional type that is capable of monitoring rates of up to 40° per second. An example of such a sensor 22 is Model 54301 as sold by the Conrac Corporation. An example of the vane 24 is Model 25147A-5 as sold by the Conrac Corporation and which has a sensitivity of +0.15° at an airspeed of 115 knots.

The stick pusher servo 26 may also be of the available conventional type. For the aircraft described, a servo Model 501-1067-02 as manufactured by Jet Electronics and Technology as a component part of autopilot Model No. 110 may be used.

The rate of change of angle of attack sensor is activated by the vane which is mounted exteriorly of the aircraft near the nose section. The vane is free to pivot about an axis so that the vane always operates aligned with the local airstream even when the wing is operating at high angles of attack. The angle of attack combined with the rate of angular change between the wing and vane is determined by the sensor 22 to activate the pitch servo 26 and hence, the stick. The rate of change of angle of attack as sensed permits actuating the stick shaker/pusher at a minimum point above true stall speed.

For example, the artifical stall speed for the above aircraft with a conventional angle of attack pusher system must be set approximately 4 knots above the true stall speed for a normal stall entry rate of 1 knot/second to provide for timely actuation of the shaker/pusher system should stall ever be approached at a high entry rate (e.g., 4 knots/second). With the rate of change of angle of attack sensor interconnected to the stick shaker/pusher system, the artificial stall speed resolved by the angle of attack sensor need be approximately 1 knot above true stall speed for normal entry rates of 1 knot/second. The rate of change of angle of attack input to the pitch servo provides for early actuation of the shaker/pusher before true stall should a high entry rate of 4 knots/second be encountered. Accordingly, the angle of attack rate of change sensor effects a 3 knot reduction of artificial stall speed as induced through the shaker/pusher system for normal stall entry rates.

For safety purposes, the FAA has determined that minimum stall speed must be multiplied by a factor of 1.3 to defined the minimum approved approach speed. Thus, an aircraft approach speed reduction of about 4 knots is realized for the 3 knot reduction of artificial stall speed (e.g., 1.3 × 3).

Additionally, strakes 36, 38 may also be included between the wing tip tanks 40, 42 and a portion of the wing leading edge to effect better aerodynamic flow over the outboard portion of the wing. The strakes combine with the leading edge 17 to further reduce the stall speed and consequently approach speed.

Several flight tests were conducted with Gates Learjet aircraft Models 24, 25 and 36 to illustrate the benefits of the leading edge of the invention per se and the leading edge of the invention in combination with: a T-tail aircraft equipped with a stick shaker/pusher system: a rate of change of angle of attack sensor; and strakes between the wing leading edge and wing tanks. The same aircraft of each model was flown with the prior art configuration and that configuration in accordance with this invention to establish comparative data. The effect of the combination on artificial stall speed is an improvement of about 12 knots (calibrated airspeed). Hence, approach speed is reduced by a factor of 1.3, or approximately 15.6 knots (calibrated).

The importance of this speed reduction is realized in terms of runway lengths required for takeoff and landing. For the above aircraft, it has been determined that a one knot reduction in artificial stall speed results in a reduced takeoff distance of approximately 80 feet and a reduced landing distance of approximately 45 feet.

Opposite from the prior art teaching or suggestions for blunt leading edges, high speed aircraft performance is not degraded by the leading edge of the invention. High speed wind tunnel data and limited flight test data indicate that overall fuel consumption and range at typical cruising speeds are substantially the same for the combination of the invention as compared with the standard configuration.

ADDITIONAL SPECIES

Figure 6:
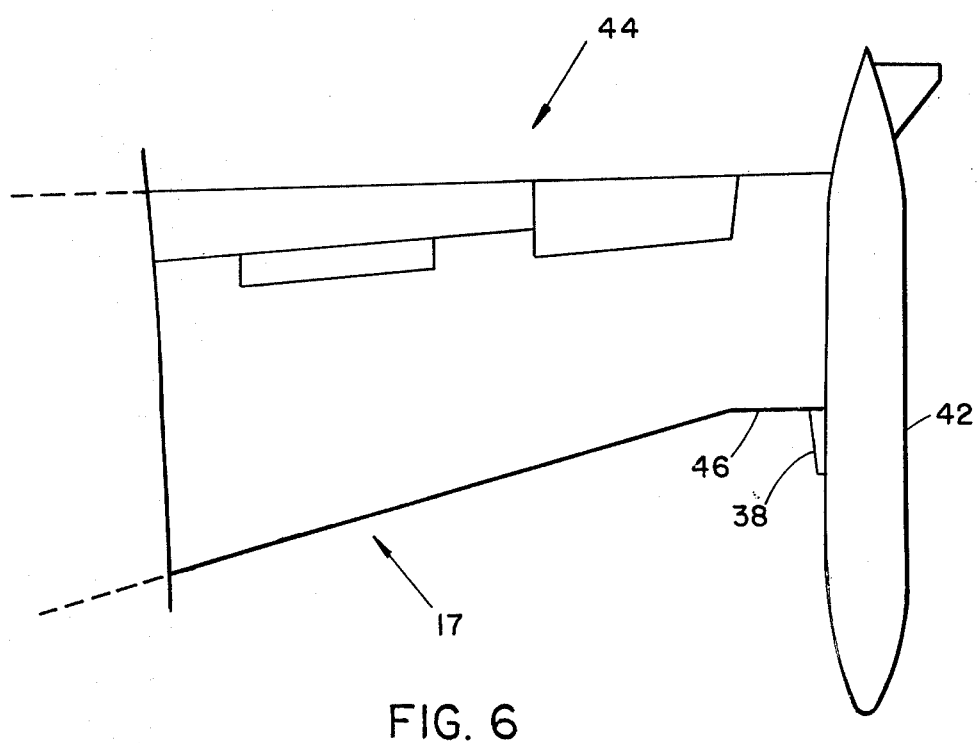
FIG. 6 is an alternate form of a wing including the leading edge of the invention.

The foregoing description has been generally directed to a tapered wing. However, the leading edge of the invention may be used with a tapered and swept wing that has a non-swept or tapered extension such as depicted in the half wing 44 of FIG. 6. This configuration corresponds to the Models 35/36 aircraft reported above. The leading edge radius (not shown) was constant throughout the non-tapered portion 46 of the extension as it is throughout the tapered portion of the wing as explained above.

Although the present description is limited to certain specific embodiments, these are not intended to limit the scope of the invention which is to be determined from the appended claims.

What is claimed is:

1. In a linearly tapered wing having an NACA 64A-109 type airfoil section with a root chord of 100 percent length and a tip chord length as a fraction of the root chord length to define a taper ratio, and upper and lower surfaces defined as fractions of a chord length, the improvement comprising:
   a contoured leading edge having a substantially constant radius selected from the range of about 0.0070 to about 0.0129 of the tip chord divided by the taper ratio, the leading edge radius substantially tangent with the upper surface of the wing and the leading edge faired into the lower surface of the wing within the range of about 6 to about 15 percent of a chord.

2. The wing as claimed in claim 1 wherein the wing has a taper ratio in the range of about 0.40 to about 0.60.

3. The wing as claimed in claim 1 wherein the leading edge radius is substantially 0.01247 of the tip chord divided by the taper ratio substantially throughout the span of the wing.

4. The wing as claimed in claim 1 wherein the wing has a quarter chord sweep of substantially 13°.

5. In a linearly tapered wing with a tip chord length as a fraction of a root chord to define a taper ratio, the wing having an NACA 64A-109 type wing section and a quarter chord sweep of about 13 degrees, the improvement comprising a leading edge having a radius characterized by the formula:

$$R_{L.E.} = \frac{K C_t}{T_r}$$

where $R_{L.E.}$ is the leading edge radius as a fraction of the root chord length, K is a constant selected of the range of about 0.0070 to of about 0.0129, $C_t$ is the tip chord length as a fraction of root chord length, and $T_r$ is the taper ratio of the range of about 0.4 to about .6.

6. The wing as claimed in claim 5 wherein the constant K is substantially 0.01247 and $T_r$ is substantially 0.507.

7. In an aircraft of the Gates Learjet type having a tapered wing substantially characterized by an NACA 64A-109 airfoil section throughout the wing span, an improved wing leading edge characterized by a constant leading edge radius substantially through the wing span and selected from the range of about 1.25 to about 1.40 inches, the constant leading edge radius defining a substantially blunt leading edge with increased camber and droop that increses from wing root to wing tip.

8. The aircraft combination as claimed in claim 7 wherein the leading edge radius is substantially consistently 1.35 inches.

9. In an aircraft of the Gates Learjet type (FAA Certification A10CE) characterized by a tapered, swept wing substantially as defined by NACA 64A-109 airfoil except for the leading edge forward of about 15% of the NACA defined chord line; a T-tail with elevators interconnected to and activateable by a stick shaker/pusher system; and fuel tanks mounted at the tips of the wing, the combination comprising:

a leading edge interconnected to the wing generally forward of about the 15 percent NACA chord line, the leading edge characterized by a constant radius substantially across the wing span, the radius of the range of about 1.25 to 1.40 inches that defines a generally blunt, drooped leading edge near the wing tip that increases in camber and droop from the wing root to wing tip; and a rate of change of angle of attack sensor interconnected to and with means for activating the stick shaker/pusher system.

10. The aircraft as claimed in claim 9 and further including two strakes, which are disposed between and attached to portions of the leading edge of the wing tips and sides of the tip tanks.

11. The aircraft as claimed in claim 10 wherein the wing has an aspect ratio of about 5.02, a taper ratio of about 0.507, a quarter chord sweep of about 13° and a dihedral angle of about 2.5°.

12. In a wing having an NACA 64A-109 airfoil section, a taper ratio between the root chord and tip chord of about 0.507, a quarter chord sweep of about 13°, the improvement comprising:

root section leading edge ordinates forward of a 15 percent chord characterized by:

| Upper Surface | | Lower Surface | |
|---|---|---|---|
| Station | Ordinate | Station | Ordinate |
| − .037 | − .265 | − .037 | − .265 |
| .324 | .607 | 1.247 | |
| .650 | .857 | radius | |
| 1.950 | 1.452 | 1.213 | 1.512 |
| 3.251 | 1.865 | Straight | |
| 4.551 | 2.182 | Line | |
| 5.851 | 2.467 | From | |
| 7.44 | 2.77 | Tangent | |
| 9.94 | 3.18 | Point | |
| 14.94 | 3.82 | 15.00 | −3.029 | tip section leading edge ordinates forward of a 15 percent chord characterized by:

| Upper Surface | | Lower Surface | |
|---|---|---|---|
| Station | Ordinate | Station | Ordinate |
| −2.105 | −1.717 | −2.105 | − 1.717 |
| −1.580 | − .350 | 2.212 | |
| −1.154 | .104 | radius | |
| .546 | .942 | .107 | −3.929 |
| 2.247 | 1.547 | Straight | |
| 3.948 | 2.019 | Line | |
| 5.649 | 2.418 | From | |
| 7.44 | 2.77 | Tangent | |
| 9.94 | 3.18 | Point | |
| 14.94 | 3.82 | 15.00 | −3.029 | and a constant leading edge radius between the root and tip sections of about 1.35 inches.

13. In a linearly tapered wing of the thin, high speed type having an airfoil section with a root cord of 100% length and a tip cord length as a fraction of the root cord length to define a taper ratio, and upper and lower surfaces defined as fractions of a cord length, the improvement comprising:

a contoured leading edge having a substantially constant radius dimension selected from the range of about 0.0070 to about 0.0129 of the tip cord divided by the taper ratio, the leading edge radius substantially tangent with the upper surface of the wing and the leading edge fared into the lower surface of the wing within a range of about 6 to about 15 percent of a cord.

* * * * *

UNITED STATES PATENT OFFICE
CERTIFICATE OF CORRECTION

PATENT NO. : 4,050,651
DATED : September 27, 1977
INVENTOR(S) : Ronald D. Neal, Richard Ross, Joseph N. Hein It is certified that error appears in the above-identified patent and that said Letters Patent are hereby corrected as shown below:

Cover page [73] Assignee: should be "Gates Learjet Corporation, Wichita, Kansas"

Column 4, line 11, the word "to" should be --do--.

Column 4, line 43, the word "an" should be --as--.

Column 4, line 64, the word "and" should be --an--.

Column 7, line 26, the term "electricl" should be --electrical--.

Signed and Sealed this

Sixth Day of June 1978

[SEAL]

Attest:

RUTH C. MASON
Attesting Officer

DONALD W. BANNER
Commissioner of Patents and Trademarks